(12) United States Patent
Sia (10) Patent No.: US 7,766,226 B2
(45) Date of Patent: *Aug. 3, 2010

(54) CODE BASED ACCESS SYSTEMS

(76) Inventor: Yik Hei Sia, 44 Jalan Indah 1/23, Taman Bukit Indah, 81200, Johor Bahru (MY)

(*) Notice: Subject to any disclaimer, the term of this patent is extended or adjusted under 35 U.S.C. 154(b) by 436 days.

This patent is subject to a terminal disclaimer.

(21) Appl. No.: 11/853,327

(22) Filed: Sep. 11, 2007

(65) Prior Publication Data

US 2007/0296546 A1    Dec. 27, 2007

Related U.S. Application Data

(60) Continuation of application No. 11/025,864, filed on Dec. 28, 2004, now Pat. No. 7,267,268, which is a division of application No. 09/250,340, filed on Feb. 16, 1999, now abandoned.

(30) Foreign Application Priority Data

Feb. 17, 1998    (MY) .................................. PI9800664

(51) Int. Cl.
*G06K 5/00*    (2006.01)
(52) U.S. Cl. ........................ 235/380; 235/382
(58) Field of Classification Search ................ 235/380, 235/382, 382.5, 487, 492
See application file for complete search history.

(56) References Cited

U.S. PATENT DOCUMENTS

| 4,972,182 | A  | * | 11/1990 | Novik et al.      | 340/5.25   |
|-----------|----|---|---------|-------------------|------------|
| 5,510,780 | A  | * | 4/1996  | Norris et al.     | 340/825.56 |
| 5,798,655 | A  | * | 8/1998  | Kazama et al.     | 324/761    |
| 6,014,650 | A  | * | 1/2000  | Zampese           | 705/44     |
| 6,018,724 | A  | * | 1/2000  | Arent             | 705/44     |
| 6,540,144 | B1 | * | 4/2003  | Hudrick et al.    | 235/462.15 |
| 7,267,268 | B2 | * | 9/2007  | Sia               | 235/380    |

* cited by examiner

*Primary Examiner*—Daniel St.Cyr
(74) *Attorney, Agent, or Firm*—K. David Crockett, Esq.; Niky Economy Syrengelas, Esq.; Crockett & Crockett (57) ABSTRACT

A system including at least two parts or stations wherein a transaction or connection between any two or more of the parts or stations is conducted or established by means of an access code, the access code being available to an accessed part or station and requiring an identical access code to be provided to an accessing part or station at the time of conducting the transaction or establishing the connection. The system is characterised in that the access code is one of a plurality of codes provided to the accessed part or station and available to the accessing part or station. The system is further characterised in that the access code is selected from the plurality of codes at the time of conducting the transaction or establishing the connection, such that no two transactions are conducted or no two connections are established with the same access codes.

15 Claims, 5 Drawing Sheets

CODE BASED ACCESS SYSTEMS

This application is a continuation of U.S. application Ser. No. 11/025,864, filed Dec. 28, 2004, now U.S. Pat. No. 7,267,268, which is a divisional application of U.S. application Ser. No. 09/250,340 filed Feb. 16, 1999 now abandoned.

FIELD OF THE INVENTIONS

The present invention relates to improvements in code based access systems.

BACKGROUND OF THE INVENTIONS

Systems in which transactions or connections between two or more parts or stations of the system are conducted or established by means of an access code are known. Such systems include computer terminals wherein the access code is a password, bank terminals such as ATM machines wherein the access code is a personal identification number (PIN) and communications terminals such as mobile telephones wherein the access code is an electronic serial number (ESN). Typically the access code is provided by a user to an accessing part or station of the system and is verified against a duplicate version of the access code available to an accessed part or station of the system, before an authority to perform the transaction or to establish the connection between the stations or parts is given.

A disadvantage of such systems is that the security of future transactions or connections becomes seriously compromised if the access code is detected by or otherwise becomes known to unauthorised persons i.e. Persons other than the person or persons authorised to perform the transactions or establish the connection.

An object of the present invention is to provide a code based access system which alleviates the disadvantages of the prior art or at least provides the public with a choice.

SUMMARY

To this end the present invention provides a system including at least two parts or stations wherein a transaction or connection between any two or more of said parts or stations is conducted or established by means of an access code, said access code being available to an accessed part or station and requiring an identical access code to be provided to an accessing part or station at the time of conducting the transaction or establishing the connection, wherein said access code is one of a plurality of codes provided to said accessed part or station and available to said accessing part or station, said access code being selected from said plurality of codes at the time of conducting the transaction or establishing the connection such that no two transactions are conducted or no two connections are established with the same access code.

Once an access code has been used to conduct a transaction or establish a connection between the two parts or stations it may be deleted from the system or otherwise disabled. This may avoid the risk that the access code will be reused by the system.

The plurality of access codes may be generated in any suitable manner and by any suitable means. The means for generating the access code preferably is capable of generating non-repeating sequences of characters or numbers. In one form the plurality of codes may be generated via a pseudo random generator. In another form the plurality of codes may be generated via a custom designed software program. The basis for the software program should be randomness and free combination. In one form the software program may be a spreadsheet type program wherein a regular grid or pattern of characters or numbers can be mixed in a controlled manner to produce non-repeating sequences of characters and/or numbers.

The characters/numbers may include Arabic numerals, Roman numerals, letters of the alphabet, morse codes, etc. in any order or combination. Preferably the access codes are generated independently of or external to the system such an approach may enhance security of the overall system by reducing risks associated with systems in which variable codes are generated internally.

The system of the present invention may include first code storage means associated with the accessing part of station of the system, such as an ATM terminal, personal computer, mobile telephone or the like. The first code storage means is adapted for storing one copy of the plurality of codes. The system may include second code storage means associated with the accessed part or station of the system, such as a bank or other service computer system or telephone exchange. The second code storage means is adapted for storing a second copy of the plurality of codes identical to the one copy stored in the first storage means. The first storage means may be incorporated into or with a transaction card such as an ATM card, a computer diskette, a smart card or integrated circuit microchip or the like. The first storage means may include a passive carrier such as a magnetic strip or the like or it may include an active carrier such as the integrated circuit microchip. Because a bank terminal system, computer service provider or telephone exchange typically will have a large number of users, the second storage means may be adapted to store a separate plurality of codes for each user. Each plurality of codes may be stored in the second storage means under a separate address. The address may be identified with a unique identity number assigned to each respective user. The identity number may be that user's account number or it may be a different number associated with that user.

It is highly desirable that the last used code be removed or otherwise disabled from the second code storage means at least, as this will minimize the risk that the same code will be reused in a subsequent transaction. This task may be performed by the bank or other service computer system. The last used code may also be erased or otherwise disabled from the first code storage means. This latter task may be performed in any suitable manner and by any suitable means. In one form this may be carried out by application of heat or mechanical marking not unlike the manner in which a telephone card is disabled according to its level of use.

When a user with an ATM card having a particular identity number, say 9876, approaches an ATM terminal to make a transaction, the following sequence of events may take place:

(i) The bank computer system requests an unused code from the plurality of codes stored by the first code storage means, e.g. the ATM transaction card. The unused code will typically be the next unused code of the plurality of codes, but the plurality codes may be used in any predetermined sequence;

(ii) The bank computer requests the next unused code of the plurality of codes stored by the second code storage means under an address for the ATM card having identity number 9876;

(iii) Upon receipt of the respective codes from the first and second code storage means the bank computer compares the codes looking for a perfect match;

(iv) A perfect match between the two codes is interpreted as a successful verification of the identity of the user's transaction card, and card number 9876 is granted permission to proceed with the transaction;

(v) A mismatch between the two codes is interpreted as an unsuccessful verification of the identity of the user's transaction card and card number 9876 is denied permission to proceed with the transaction;

The present invention also provides a method of conducting a transaction or establishing a connection between at least two parts or stations by means of an access code, said access code being available to an accessed part or station at the time of conducting the transaction or establishing the connection and requiring an identical access code to be provided to an accessing part or station, said method including the steps of:

Making available a plurality of codes to said accessed and said accessing parts or stations;

Selecting, at the time of conducting the transaction or establishing the connection, one code from said plurality of codes; and Using said selected code to conduct the transaction or establish the connection such that no two transactions are conducted or two connections are established with the same access code.

The access code system of the present invention may be used in place of an existing or conventional access code system or systems or it may be used in addition to an existing or conventional access code system or systems to upgrade the security of the latter. The improved system provided by the present invention may be incorporated into a newly designed code based access system or it may be provided by modifying an existing system to distinguish access codes according to the present invention from prior art codes they will hereinafter be referred to as "secondary" codes.

The system of the present invention may be used to enhance security of a door opening apparatus, in particular door opening apparatus which makes use of an electronic key for accessing secure areas such as safes, strong rooms, high security areas or the like. In the latter embodiment a set of secondary security codes according to the present invention may be loaded to a first code storage means associated with the accessed part of the system. The accessed part may be a user inaccessible part of the door opening apparatus. The first code storage means may include an integrated circuit microchip, magnetic strip, smart card, computer diskette or the like. An identical set of codes may be made available to the accessing part of the system. The accessing part may be a user accessible part of the door opening apparatus. The accessing part may include an electronic key. The electronic key may include a second code storage means for storing an identical set of security codes. The second code storage means may include a magnetic strip, smart card, integrated circuit microchip, computer diskette or the like.

BRIEF DESCRIPTION OF THE DRAWINGS

Preferred embodiments of the present invention will now be described with reference to the accompanying drawings wherein.

DETAILED DESCRIPTION OF THE INVENTIONS

Figure 1:
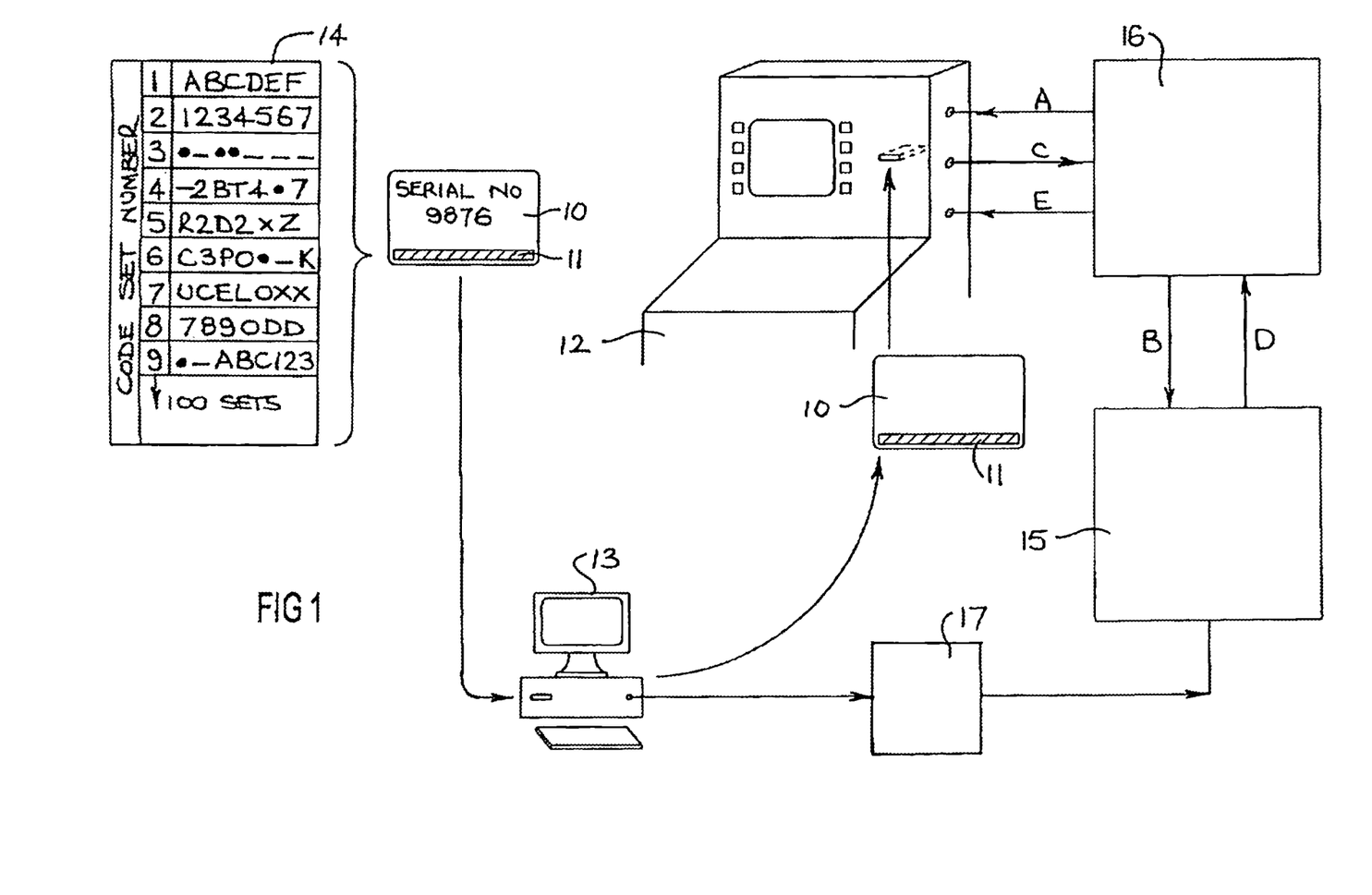
FIG. 1 shows a diagrammatic representation of one form of application of the present invention to bank terminals.

Referring to FIG. 1, there is shown an ATM access card 10 which serves as a carrier for secondary codes according to the present invention. In addition to the known magnetic strip (not shown) which carries the account number of the client, ATM card 10 includes a carrier strip 11 in which are stored secondary codes according to the present invention. Prior to using ATM card 10 at an ATM terminal 12, ATM card 10 is inserted into a dedicated disc drive of a Personal Computer (PC) 13. PC 13 is programmed to generate a non-repeating set of 100 secondary codes 14 and to write the set of codes 14 into carrier strip 11. An identical set of 100 codes is sent to data storage module 15 associated with the bank's main computer system 16. The set of codes 14 may optionally be sent to code replacement module 17 where they may be held temporarily pending transfer to storage module 15. After the set of codes have been written into carrier strip 11 and storage module 15 or code replacement module 17, PC 13 is programmed to delete the code set from its memory. This enhances security of the system by ensuring that no additional copies of the code set remain in existence.

ATM card 10 which carries identification serial number 9876 may then be inserted into a (modified) card slot associated with ATM terminal 12. The holder of ATM card 10 may key in his PIN number to commence a transaction and this may continue to provide a primary level of security as is known in the art. To provide a secondary level of security according to the present invention, main computer 16 sends a request A to ATM terminal 12 for the first unused code (ABCDEF) from the set 14 of 100 codes written into carrier strip 11 associated with ATM card 10. Main computer 16 also sends a request B for the first unused code from the identical set of 100 codes stored in data storage module 15 under an address for the ATM card carrying identification serial number 9876.

ATM terminal 12 sends reply C to computer 16 including the first unused code (ABCDEF) from carrier strip 11 and data storage module 15 sends reply D including the first unused code stored under the address corresponding to ATM card bearing serial number 9876. When computer 16 identifies a match between the codes included in replies C and D, it interprets this as a successful verification of the identity of ATM card 10 bearing serial number 9876 and grants permission E to ATM terminal 12 to proceed with the transaction.

When computer 16 identifies a mismatch between the codes included in replies C and D, it interprets this as an unsuccessful verification of the identity of ATM card 10 bearing serial number 9876 and denies permission to ATM terminal 12 to proceed with the transaction. A mismatch between the codes included in replies C and D indicates that an unauthorised penetration of the banking system may have taken place. Instead of barring further transactions in the event of a mismatch between the codes included in replies C and D, computer 16 may be programmed to request another code set each from ATM terminal 12 and data storage module 15. Preferably computer 16 is programmed to request three further code sets each from ATM terminal 12 and data storage module 15. If three consecutive code sets do not match, computer 16 may reasonably assume that the banking system has been penetrated by unauthorised elements and may bar further transactions of the account via the ATM card. Even if two out of three codes match computer 16 may still bar the transaction. Computer 16 may continue to request codes for verification until it has three consecutive matches, and may then return ATM card 10 to the user but not issue cash.

Computer 16 may advise the user via the screen associated with ATM terminal 12 to contact the local branch of his bank and seek assistance e.g. to have the account number and/or code sets changed. The detected instance of potential breach of ATM card security may be recorded and communicated to the user immediately via telephone/fax/mail and/or the next authorised transaction made by the user.

When the holder of the ATM card commences a subsequent transaction, computer 16 sends a request to ATM terminal 12 for the second unused code (1234567). This process continues until all 100 secondary codes have been used up one at a time. When all 100 codes sets have been used up the user will be advised via ATM terminal 12 to contact his bank to have the defunct carrier strip 11 replenished with a fresh set of 100 codes. Carrier strip 11 may be replenished by rewriting. Alternatively, if the technique used for disabling/deleting used codes has harmed the integrity of the carrier strip 11, carrier strip 11 may be removed from the ATM card and replaced with a fresh carrier strip. The fresh carrier strip may be supplied to the bank branch from a central location already written with a new set of 100 codes. The fresh carrier strip may be supplied attached to a blank or dummy card to facilitate handling, programming and transfer of the carrier strip to a customer's ATM card.

Figure 2A:
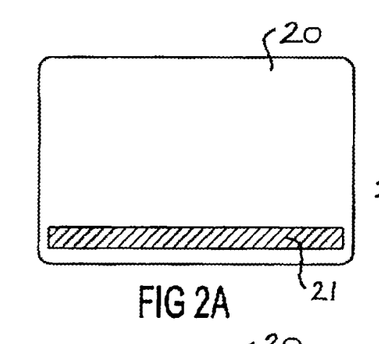
FIGS. 2A, 2B and 2C show front, rear and cross-sectional views respectively of a dummy ATM card.
Figure 2B:
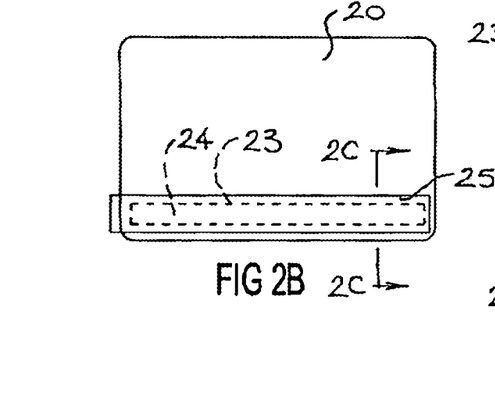
Figures 2C, 3A, 3B, 3C, 4:
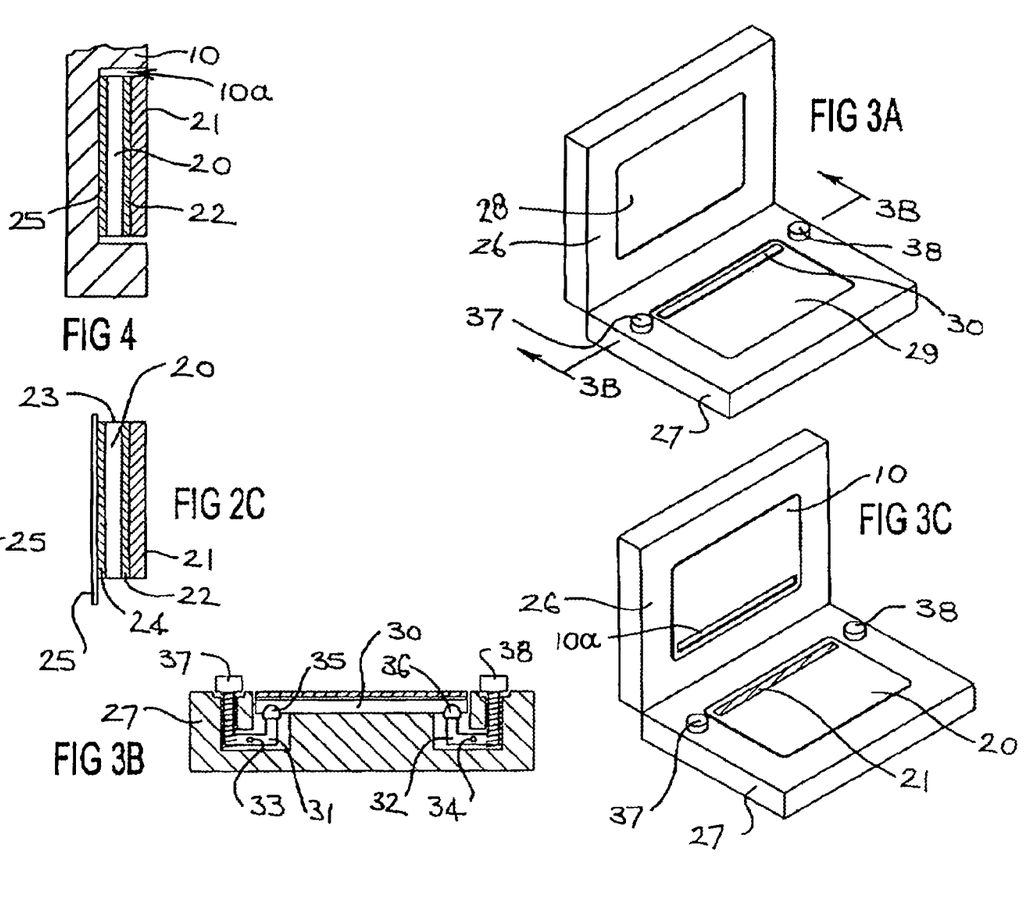
FIGS. 3A, 3B and 3C show empty, loaded and cross-sectional views respectively of a carrier strip transfer apparatus.
FIG. 4 shows a cross-sectional views of an ATM card with carrier strip installed.

Referring to FIGS. 2A-C there is shown a dummy card 20 formed from 0.4 mm thick plastics. This is about half the thickness of an ATM card. Fresh carrier strip 21 is attached to the front of dummy card 20 via a layer of adhesive 22. As shown in FIG. 2B, dummy card 20 is perforated at edges 23 adjacent the perimeter of carrier strip 21 and carrier strip 21 is arranged to break away from the main body of dummy card 20. A local layer of adhesive 24 overlaying carrier strip 21 is applied to the back of dummy card 20 as shown in FIGS. 2B and 2C. Adhesive layer 24 is protected by a removable non-stick plastic cover 25.

Fresh carrier strip 21 may be transferred to a customer's existing ATM card via an apparatus as shown in FIGS. 3A to 3C. Referring to FIG. 3A, the apparatus includes hinged upper and lower panels 26, 27. Upper panel 26 includes a recess 28 for receiving an ATM card. The ATM card includes a recess 10A for receiving carrier strip 21 (refer FIG. 4.) Lower panel 27 includes a recess 29 for receiving the dummy card 20. Lower panel 27 also includes an embossing bar 30 positioned so that it coincides with carrier strip 21 when dummy card 20 is received in recess 29.

Embossing bar 30 is positioned so that it also coincides with recess 10A in the ATM card when the latter is received in recess 28 and upper and lower panels 26 and 27 are closed against each other. Referring to FIG. 3B, embossing bar 30 in its rest position is below the level of the non-recessed face of lower panel 27 by the thickness of dummy card 20. Embossing bar 30 rests on see-saw brackets 31, 32. See-saw brackets 31, 32 are mounted for pivotal movement about respective pivot points 33, 34. The inner ends 35, 36 of brackets 31, 32 abut embossing bar 30. The outer ends 37, 38 of brackets 31, 32 project beyond the face of lower panel 27 such that when upper and lower panels 26 and 27 are closed against each other, brackets 31, 32 pivot, lifting embossing bar 30 approximately 0.5 mm above its rest position.

In operation an ATM card 10 devoid of its carrier strip is received in recess 28 and dummy card 20 with carrier strip 21 intact is received in recess 29 as shown in FIG. 3C. To effect transfer of carrier strip 21 from dummy card 20 to ATM card 10, cover 25 is peeled away from adhesive layer 24 and upper panel 26 is closed firmly against lower panel 27 of the apparatus. This caused embossing bar 29 to lift to a position about level with the non-recessed face of panel 27, breaking perforated edges 23 and causing carrier strip 21 to lodge into recess 10A in ATM card 10 (refer FIG. 4). Upon opening of the apparatus, transfer of carrier strip 21 from dummy card 20 to the customer's ATM card 10 should be complete.

Transfer of carrier strip 21 from dummy card 20 to the customers ATM card 10 may also be performed manually. This may be done by firstly removing the cover 25 from adhesive layer 24 and placing dummy card 20 on top of ATM card 10, both in an upright and face up position. The two cards may be held firmly together e.g. by means of adhesive tape applied to the tops and sides of the cards. The two cards should then be placed on a hard surface such as the edge of a table and an embossing bar approximately equal in dimensions to carrier strip 21 (78 mm×4 mm) placed on the top of carrier strip 21. The embossing bar should then be pressed down firmly with both thumbs. The thumbs may be slid along the length of the embossing bar until carrier strip 21 breaks away from dummy card 20 along its perforated edges 23 and is pushed into recess 10A in ATM card 10. The adhesive tapes may then be removed and transfer of carrier strip 21 to ATM card 10 should be complete.

Each bank branch may hold a large number of dummy cards with attached replacement carrier strips. To maintain security of the allocation process the customer may select at random a replacement carrier strip from a batch of say 1000 replacement strips. When the customer selects his carrier strip it is affixed to his ATM card and the central bank computer is notified of the choice. The central bank computer then associates its second copy of the set of codes identical to the chosen replacement strip with the customer's account or other identification number.

Figure 5:
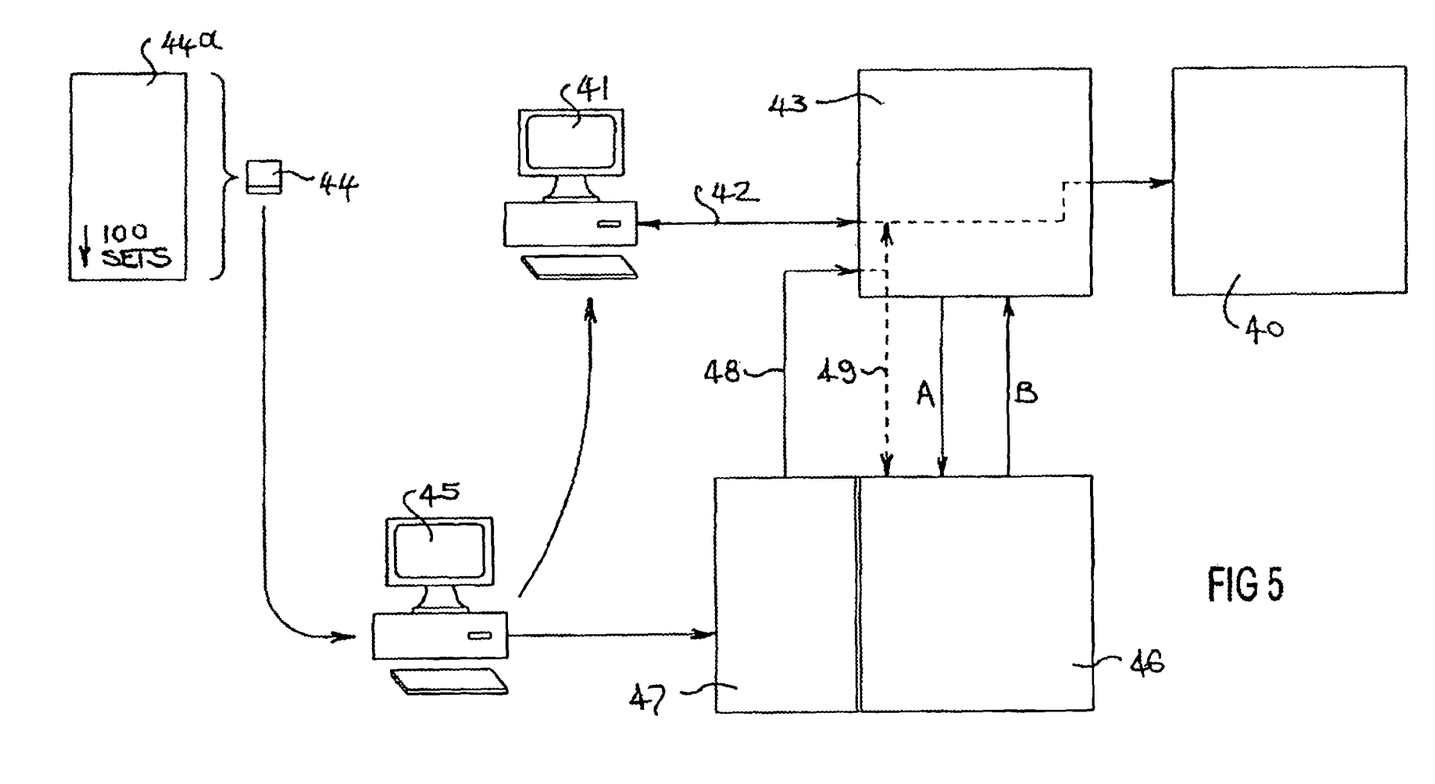
FIG. 5 shows a diagrammatic representation of one form of application of the present invention to a mainframe computer system.

The system shown in FIG. 5 protects a mainframe computer system 40 from hacking by way of external links to the computer system 40. Security is typically provided in this context by way of a common password for all authorised users of computer system 40 and optionally another password for individual users. The passwords are usually changed once a week. This allows a hacker who gains access to the password or passwords to commit repeated break-ins over the period of currency of the password(s) and to gain access to confidential information and corrupt the system with unauthorised data or a virus.

The present invention allows operators of computer systems to substantially limit risk of random break-ins and to avoid repeated break-in activities.

Referring to FIG. 5 there is shown a personal computer (PC) 41 connected to computer system 40 via connection 42 such as the internet, and a verification module 43. Before access to computer system 40 can be granted verification module 43 must receive a valid code(s) from PC 41. The valid code(s) may include the usual password or passwords and includes a secondary code according to the present invention. A set of secondary codes 44a may be stored on an authorisation diskette 44 which serves as a carrier for the secondary codes. Diskette 44 is adapted to store 100 sets of secondary codes. The set of secondary codes 44a is loaded to diskette 44 via PC 45 belonging to or being under the control of the owner or operator of computer system 40.

Once it is loaded with the secondary codes 44*a* diskette 44 is supplied via a secure route to the authorised user of computer system 40. The authorised user is obliged to store diskette 44 in a secure and preferably locked or otherwise restricted location. Diskette 44 will typically be available for use with a designated PC/terminal i.e. a terminal having a specific E-mail address, unless a roaming authority has been granted.

Diskette 44 should only need to be sent to new clients or first time users (including replacements for lost, barred and malfunctioning disks) because subsequent replacements codes (i.e. after a current set of 100 codes has been used up) can be sent to the user's PC 41 via connection 42 after it has been verified. A set of 100 secondary codes identical to the set loaded to diskette 44 is sent from PC 45 to storage module 46 associated with verification module 43. The set of codes may optionally be sent to code replacement module 47 where they may be held temporarily pending transfer to storage module 46.

When a user requests access to computer system 40 and (optionally) keys in his passwords into PC41, verification module 43 sends a requests to PC41 via connection 42 for the first unused code from the list of 100 codes stored on diskette 44. Module 43 also sends a request A for the first unused code from the identical set of 100 codes stored in storage module 46 under an address specific to PC41. PC41 sends a reply to verification module 43 including the first unused code stored on diskette 44, and storage module 46 sends reply B to verification module 43 including the first unused code stored under the address which corresponds to PC41. When verification module 43 identifies a match between the codes received from PC41 and storage module 46 it interprets this as a successful verification of the identity of PC41 and grants access to PC41 to connect to computer system 40.

Even if the first set of codes is not immediately deleted after use for any reason, the verification software should be programmed so that it avoids reusing a previously used code. When the user next requests access to computer system 40, verification module 43 sends a request for the second unused code. This process continues until all 100 secondary codes have been used up one at a time. Diskette 44 will then be defunct as it has no more verification codes available and must be replenished or replaced.

In one form a code replacement program may be activated upon positive verification of an access using the last or 100th code. Upon detecting a verification which utilises the 100th code, code replacement module 47 is activated to choose at random a new group of 100 secondary codes stored in module 47 and to download this to diskette 44 via line 48, module 43, line 42 and PC41. During this process an image appears on the screen of PC41 warning the user not to remove diskette 44 from PC41. Module 47 also loads an identical set of codes to storage module 46. The verification software may then assign via line 49 the identity of PC41, such as its E-mail address, to the set of codes just loaded to storage module 46. Code replacement module 47 may hold a large stock of unused code sets (e.g. 1000) ready to be downloaded upon receiving a request from verification module 43.

When verification module 43 identifies a mismatch between the codes received from PC41 and module 46 it interprets this as an unsuccessful verification of the identity of PC41 and denies further access to PC41 to connect to computer system 40. A mismatch between the codes received from PC41 and module 46 indicates that an unauthorised penetration of the computer system may have taken place.

The user is advised of this status and of the need for increased security/access to PC41 to prevent further unauthorised activities and/or the need to change passwords, diskette 44 etc.

Instead of barring further access in the event of a mismatch between the codes, module 43 may be programmed to request another code set each from PC41 and data storage module 46. Preferably module 43 is programmed to request a further three code sets each from PC41 and data storage module 46. If three consecutive code sets do not match, module 43 may reasonably assume that the computer system has been penetrated by unauthorised elements and may bar further access to PC41. Even if two out of three codes match module 43 may still bar access. Module 43 may continue to request codes for verification until it has three consecutive matches, and only then may grant access to PC41.

Figure 6:
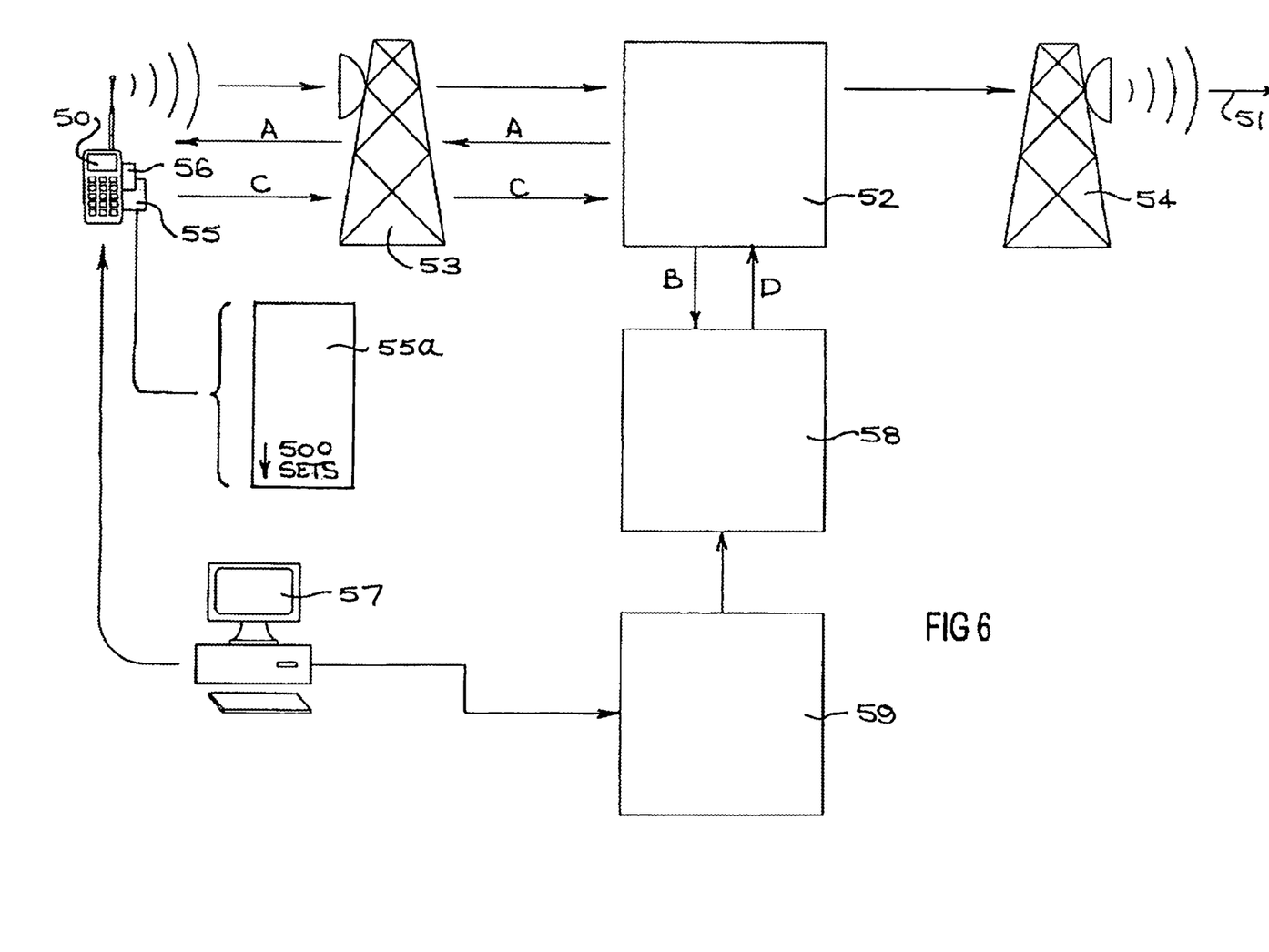
FIG. 6 shows a diagrammatic representation of one form of application of the present invention to a mobile transceiver.

The system shown in FIG. 6 protects a mobile transceiver such as a cellular telephone from unauthorised use. Security is typically provided in this context by means of an electronic serial number (ESN) which establishes the identity and authenticity of an incoming call placed through a host transceiver. During the process of registration and activation of a new cellular telephone, matching sets of ESNs are respectively placed in the mobile transceiver and in the data bank of a main telephone exchange.

When a call is placed through the mobile transceiver, the transceiver transmits its ESN followed by the telephone number of a recipient transceiver. The transmitted signal is relayed via a receiving dish to the data bank of the telephone exchange. The ESN of the mobile transceiver is then compared to the matching ESN in the databank. When a match is established, the call is recognised by the telephone exchange as genuine and is authorised passage to the next stage (where no match is established between the transceiver ESN and the data bank ESN, the call is rejected and refused passage through the main exchange). The telephone number of the recipient transceiver is then sent by the telephone exchange to a transmitting tower for transmission to the recipient transceiver.

Referring to FIG. 6, there is shown a host transceiver 50 linked to a recipient transceiver 51 (not shown) via telephone exchange 52 and respective transceiver stations 53, 54. Before access to recipient transceiver 51 can be granted, telephone exchange 52 must receive a valid code(s) from host transceiver 50. The valid code(s) may include a conventional ESN and includes a secondary code according to the present invention. A set of secondary codes may be stored in an integrated circuit microchip/smart card (IC) 55 fitted to host transceiver 50.

IC 55 is in addition to the usual ESN integrated circuit microchip/smart card 56 fitted to host transceiver 50. IC 55 is adapted to store 500 sets of secondary codes 55*a*. The set of secondary codes 55*a* is transferred to IC 55 via PC 57 belonging to or being under control of the owner or operator of telephone exchange 52. PC 57 includes a dedicated IC writer for this purpose. Once IC 55 is programmed, it is sent to a local branch office of the telephone service operator or his agent for installation to a new subscriber's transceiver or for replacement of a defunct IC i.e. an IC which has exhausted all of its secondary codes.

A set of 500 secondary codes identical to the set 55*a* stored in IC 55 is sent from PC57 to storage module 58 associated with telephone exchange 52. The set of codes may optionally be sent to code replacement module 59 where they may be held temporarily pending transfer to storage module 58.

When host transceiver 50 places an outgoing call it transmits its ESN which is picked up by transceiver station 53 and relayed to telephone exchange 52. The transmitted ESN is then compared to the matching ESN in the data bank of telephone exchange 52. When a match is established the ESN is recognised by telephone exchange 52 as legitimate and the call is authorised passage to the next stage.

According to the present invention telephone exchange 52 sends a request A to host transceiver 50 via transceiver station 53 for the first unused code from the set of 500 codes 55a stored in IC 55. Telephone exchange 52 also sends a request B for the first unused code from the identical set of 500 codes stored in storage module 58 under an address specific to host transceiver 50. In practice the storage address may be associated with the unique ESN assigned to host transceiver 50.

Host transceiver 50 sends a reply C including the first unused code stored in IC 55 to telephone exchange 52 and storage module 58 sends reply D to telephone exchange 52 including the first unused code stored under the address which corresponds to host transceiver 50. When telephone exchange 52, identifies a match between the codes included in replies C and D, it interprets this as a successful verification of the host transceiver 50 and allows the telephone number of the recipient transceiver 51 sent by host transceiver 50, to be transmitted to transceiver station 54 and relayed to recipient transceiver 51.

Even if the first set of codes is not immediately deleted after use for any reason, the verification software should be programmed so that it avoids reusing a previously used code. When the subscriber next places an outgoing call, telephone exchange 52 sends a request for the second unused code. This process continues until all 500 secondary codes have been used up one at a time. IC55 will then be defunct as it has no more verification codes available and must be replenished/replaced.

When all 500 codes have been used up (in practice this may be a lesser number to allow some reserve calls to be made before receiving a replacement for IC55) the telephone exchange can advise the subscriber (e.g. by means of a recorded message following verification of, say, the 490th call) to contact his local branch to have the defunct (or soon to be defunct) IC 55 replaced with a fresh IC. The fresh IC may be supplied to the branch office already loaded with a new set of 500 codes. Each branch office may hold a large number of replacement IC's to maintain security of the allocation process the subscriber may select at random a replacement IC from a batch of, say, a 1000 replacement ICs. When the subscriber selects his/her IC it may be fitted to his transceiver and the telephone exchange notified of the choice. The telephone exchange may then associate its second copy of the set of codes identical to the chosen replacement IC with the subscribers ESN or other identification number.

IC 55 may be located in an easily accessible position in the associated transceiver to enable replacement of defunct ICs. In some embodiments IC 55 may comprise a smart card. IC 55 also may be integrated with ESN IC 56. Typically a transceiver will require modification to accommodate IC55. This may be done by way of a sliding carrier not unlike a smart card. New transceivers may be constructed with a built-in slot for receiving IC 55 and/or associated carrier.

Figure 7:
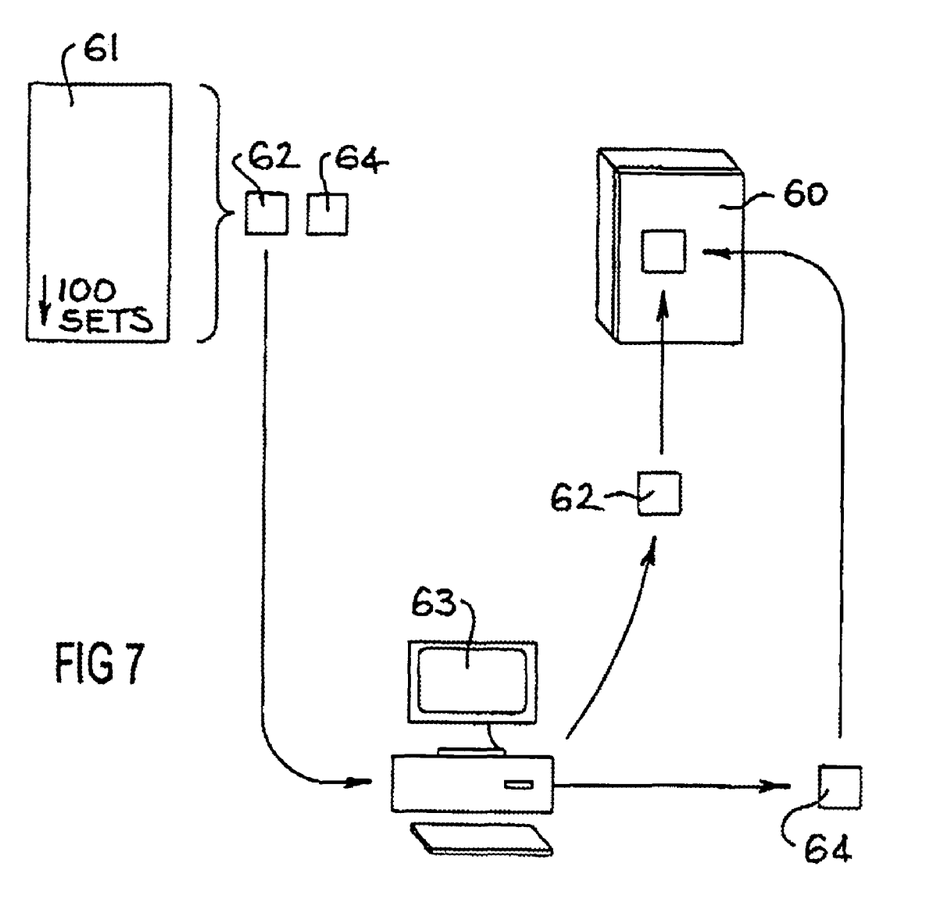
FIG. 7 shows a diagrammatic representation of one form of application of the present invention to a door opening apparatus.

Referring to FIG. 7, there is shown a safe/strong room 60. Safe/strong room 60 includes a code based door opening apparatus according to the present invention.

The door opening apparatus includes a first code storage means associated with a user inaccessible part of the door opening apparatus. The first code storage means is adapted for storing a set of secondary codes 61. The first code storage means include a computer diskette 62. The diskette 62 may be adapted to store 100 sets of secondary codes. The set of secondary codes 62 is loaded to diskette 62 via PC 63.

Once it is loaded with secondary codes 61 diskette 62 is installed to the user inaccessible part of the door opening apparatus.

PC 63 is used to load an identical set of secondary codes 61 to a second diskette 64. Diskette 64 is in possession of the owner of safe/strong room 60 or other authorised person, who is obliged to store diskette 64 in a secure and preferably locked or otherwise restricted location. When the owner/authorised person requires access to safe/strong room 60, diskette 64 serves as an electronic key to activate the door opening apparatus and gain access to safe/strong room 60.

When diskette 64 is inserted into the user accessible part of the door opening apparatus associated with safe/strong room 60, the door opening apparatus requests the first unused code from the list of 100 codes stored on diskette 62. The door opening apparatus also requests the first unused code from the identical set of 100 codes stored in diskette 64. When the door opening apparatus identifies a match between the codes received from diskette 62 and diskette 64 it interprets this as a successful verification of the identity of the electronic key and opens the door.

Finally, it is to be understood that various alterations, modifications and/or additions may be introduced into the constructions and arrangements of parts previously described without departing from the spirit or ambit of the invention.

I claim:

1. A method wherein electronic access codes are used in conducting secure electronic transactions and in establishing secure electronic connections in a computer system, comprising:

providing said electronic security messages in the form of advisory instructions, directives, information and communications pertaining to the subscriber's usage of said access codes, authorization, authentication and verification related needs; need for replenishment of new codes into defunct or soon to be defunct I.C. microchips or smart cards; replacement of said defunct or soon to be defunct I.C. microchips or smart cards; potential and attempted security breaches and warnings;

wherein said electronic security messages are instantly transmitted between an accessed station and an accessing station;

wherein a customer is immediately notified of the detected instance of security breaches including unauthorized penetration of the computer system; and advising preventive measures and risks mitigating actions to be taken by said user including increased security and access, change of passwords, storage means, account numbers or access codes.

2. A method as recited in claim 1, wherein:

operators of computer systems utilize an electronic communications system comprising transceiver stations and the internet to deliver access codes and security verification messages pertaining to the usage of said access codes;

operators of computer systems utilize the access codes and security verification messages in conducting secure electronic business transactions.

3. A method as recited in claim 2, wherein said accessing station comprises a personal computer.

4. A method as recited in claim 2, wherein said accessing station comprises part of a computerized bank terminal system.

5. A method as recited in claim 4, wherein the electronic security verification message is conveyed by means of PC monitors or display screens; wherein,
- a computer advises the user via the a screen associated computerized bank terminal system to contact the local branch of his bank and seek assistance, e.g., to have the account number and or codes sets changed; wherein,
- the user will be advised via the computerized bank terminal system to replenish his storage means with fresh access codes; wherein,
- an image appears on the screen associated computerized bank terminal system warning the user not to remove his storage means from computerized bank terminal system.

6. A system for automated repetitive verification of user identity comprising:
- a verification software module capable of automatically activating at least one verification;
- code replenishment means wherein a memory-storage means retains the codes and the codes are replenished with new supplies of access codes;
- said self-replenishment process being automatically initiated by the verification software program ensuring a supply of fresh access codes for verification;
- said self-replenishment process comprising; maintaining at least one new access code in support of an automated self-replenishment mechanism;
- providing a trigger mechanism initiated by a low number of fresh access codes remaining in the storage memory devices;
- providing a self-replenishment mechanism enabled by means of an Internet download implemented by said software program, wherein said replenishment mechanism is automatically activated; wherein spent access codes that have been previously used are replaced, rewritten, updated and topped up with at least one fresh access code;
- providing an auto-select mechanism wherein, at least one fresh access code is automatically selected out of a stockpiled reserve of codes, for delivery via an electronic communications system;
- delivering said at least one fresh access code into the end-user's memory device.

7. A system as recited in claim 6, further comprising means wherein, a verification process utilizing the last of the at least one access codes serves to act as the trigger mechanism, prompting the service provider's verification software to initiate an auto-selection and thereafter an Internet download sequence; and selecting at least one fresh access code, after said user has been verified, and downloading said fresh group directly into said user's electronic utility appliances and storage memory means.

8. A system as recited in claim 6, wherein an auto-selection mechanism is initiated for choosing at random, at least one new access code out of the stockpiled reserve of codes stockpiled for auto-loading.

9. A system as recited in claim 6, further comprising means of a self-replenishment mechanism of the software program which is activated after the user has been verified; wherein said at least one access codes is delivered by means of an Internet download into the user's electronic utility appliances and the first storage means; wherein said delivery means comprise a wireline electronic communication systems.

10. A system as recited in claim 9, wherein said delivery means comprises a wireless electronic communication systems.

11. A system as recited in claim 10, wherein said electronic communication systems and means of delivery means comprise the Internet.

12. A system as recited in claim 11, further comprising the means for storing said at least one access code from said user's electronic utility appliances into related storage-memory means directly associated with said Automated Teller Machine terminals, mobile hand-phones and personal computers.

13. A system as recited in claim 12, wherein said storage-memory means comprises smart-cards.

14. A system as recited in claim 13, wherein said storage-memory means comprises integrated circuit microchips.

15. A system as recited in claim 9, further comprising means of a self-replenishment mechanism wherein, a second part of the at least one access code, is concurrently assigned, and auto-loaded from a code replacement module (17, 47, 59) into said second codes storage means and the codes storage module (15, 46, 58) associated with the accessed part or station under an address which corresponds to a first storage means such as unique identity assigned to each respective user.

* * * * *